(12) United States Patent
Shimobayashi et al.

(10) Patent No.: US 7,406,122 B2
(45) Date of Patent: Jul. 29, 2008

(54) EQUALIZER AND METHOD OF SETTING INITIAL VALUE FOR SAME

(75) Inventors: Shinya Shimobayashi, Tokyo (JP); Mariko Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 11/007,199

(22) Filed: Dec. 9, 2004

(65) Prior Publication Data
US 2005/0129106 A1 Jun. 16, 2005

(30) Foreign Application Priority Data
Dec. 10, 2003 (JP) ............................. 2003-411701

(51) Int. Cl.
*H03H 7/30* (2006.01)
*H03H 7/40* (2006.01)
*H03K 5/159* (2006.01)

(52) U.S. Cl. ...................... 375/233; 375/234; 375/232; 375/231; 708/322; 708/323

(58) Field of Classification Search ................. 375/232, 375/233, 234, 231, 230, 346, 348, 350
See application file for complete search history.

(56) References Cited

U.S. PATENT DOCUMENTS 5,283,811 A * 2/1994 Chennakeshu et al. ...... 375/233
5,517,524 A 5/1996 Sato
2003/0053571 A1 * 3/2003 Belotserkovsky et al. ... 375/350

FOREIGN PATENT DOCUMENTS

JP H06-120774 A 4/1994
WO WO 00/59168 A1 10/2000

OTHER PUBLICATIONS

Nisshin Shuppan Co., "Base and Application of Signal Processing", pp. 202-217.
Haykin S: "Adaptive Filter Theory, Passage" Adaptive Filter Theory, 1996, pp. 432-437, XP002251177.

* cited by examiner

*Primary Examiner*—Phuong Phu
(74) *Attorney, Agent, or Firm*—Sughrue Mion, PLLC

(57) ABSTRACT

An equalizer is provided which is capable of making a filter factor to be set in the equalizer having an equalizing filter converge rapidly and a method is provided for setting an initial value for the rapid convergence of the filter factor. In the equalizer having a filter factor computing device to compute a filter factor for an equalizing filter, and a differential detecting circuit to generate a differential signal between a signal output from the equalizing filter and a common pilot diffusing code, an initial value for the filter factor computing device is generated and set by a multipath timing detecting circuit, a reverse diffusing section, and a channel estimating device being operated based on a received signal.

8 Claims, 4 Drawing Sheets transmitted data received data channel estimating value (FV)

EQUALIZER AND METHOD OF SETTING INITIAL VALUE FOR SAME

BACKGROUND OF THE INVENTION

1. Field of the Invention

The present invention relates to an equalizer and more particularly to the equalizer capable of making a filter factor for the equalizer rapidly converge and a method for setting an initial value for the equalizer.

The present application claims priority of Japanese Patent Application No. 2003-411701 filed on Dec. 10, 2003, which is hereby incorporated by reference.

2. Description of the Related Art

A transmission speed of a mobile communication device such as a portable phone is increasing every year. In particular, in the case of portable telephone communications employing a W-CDMA (Wideband Code Division Multiple Access) method, by bringing an HSDPA (High Speed Downlink Packet Access) way into the portable telephone communications, a maximum transmission speed of 14.4 Mbps has been gained. In such the case where the transmission speed is increasing, it is of importance that a signal whose quality has been degraded due to an influence by fading during the signal transmission is successfully regenerated at a side of a signal receiver. To solve these problems, in addition to a RAKE receiving method that can be realized in a comparatively easy way, an equalizer and/or interference canceler are being introduced. That is, a data receiving device is proposed in, for example, Japanese Patent Application Laid-open No. Hei06-120774, in which its equalizer is provided that can perform an excellent effect of improving an error rate, in digital communications, which is realized by setting a tap factor in a manner to match a state of a communication line and by changing a transmission characteristic to compensate for a wave distortion.

FIG. 5 is a block diagram for schematically showing configurations of a conventional NLMS (Nonlinear Least Mean Square) equalizer 50. The equalizer 50 includes a filter factor computing device 51, an equalizing filter 52, and a differential detecting circuit 53. A received signal "X(n)" is input to the filter factor computing device 51 and the equalizing filter 52. An output "W(n)" from the filter factor computing device 51 is input to the equalizing filter 52. The equalizing filter 52 outputs an output signal "y(n)", inputs the signal "y(n)" to the differential detecting circuit 53, then detects a differential "e(n)" between the signal "y(n)" and a pilot signal diffusing code "d(n)" and inputs the differential "e(n)" to the filter factor computing device 51.

More specifically, the received signal "X(n)" to be input to the equalizer 50 is input to the equalizing filter 52. The equalizing filter 52 outputs a signal resulting from addition of all values obtained by multiplying an equalizing filter factor sequence $W(n)=(W_0, W_1, \ldots, W_{F-1})$ (F: number of filters) by the received signal "X(n)" as an output value. The equalizing filter factor sequence "W(n)" is set by the filter factor computing device 51. When an output value of the equalizing filter 52 is "y(n)", $y(n)=W(n)X(n)$.

Next, FIG. 6 is a block diagram for showing specified configurations of the equalizing filter 52 of FIG. 5. The equalizing filter 52 is made up of a plurality ("F−1" pieces) of delay circuits 21 being cascaded, a plurality ("F" pieces) of multipliers 22 to multiply input and output values of signals to be input to or output from these delay circuits 21 by each of corresponding filter factors $W_0$ to $W_{F-1}$, and an adder 23 to sum up values of the output signals from the plurality of multipliers 22 (not shown).

Each of the delay circuits 21 multiplies a received signal by an amount of delay corresponding to one chip time, and the received signal delayed by $k(0 \leq k \leq F-1)$ chips is multiplied by a filter factor $W_{F-1-k}$. All results from the multiplication are summed up by the adder 23 and are output as output signals. The received signal is delayed, by one chip, up to the (F−1)-th chip.

An appropriate value, for example, a value "0" is set for all initial values W(n) of equalizing filter sequences. A signal "y(n)" output from the equalizing filter 52 is input to the differential detecting circuit 53. In the differential detecting circuit 53, a differential signal "e(n)" between an output "y(n)" from the equalizing filter 52 and a pilot signal diffusing code "d(n)" is calculated and the calculated differential signal "e(n)" is output to the filter factor computing device 51. The differential signal "e(n)" is shown by the following equation (1):

$$e(n)=d(n)-y(n)=d(n)-W(n)X(n) \qquad \text{Equation 1}$$

In the filter factor computing device 51, a filter factor is renewed according to the following Equation 2 based on a received signal sequence "X(n)" and differential signal "e(n)", and a filter factor sequence W(n) being produced prior to the renewal:

$$W(n+1)=W(n)+\mu e(n)X(n) \qquad \text{Equation 2}$$

where "μ" denotes a step-size parameter, which is shown by the following Equation (3):

$$\mu=\alpha/(X(n)^H X(n))+\beta \qquad \text{Equation 3}$$

where "β" denotes a stabilizing parameter (it takes on a sufficiently small positive value), α denotes a step-size parameter, and "$X(n)^H$" denotes a transposed conjugate vector of X(n).

After the renewal, equalization by a filter and renewal of a filter factor are repeated. Moreover, for a principle of the renewal of filter factors, refer to, for example, "Base and Application of Signal Processing" (ISBN4-8173-0106-6, Pages 202 to 217) by Nisshin Shuppan Co., and a like.

In the above conventional technology, a filter factor is made to converge by setting an appropriate value for an initial value of the filter factor and by repeating operations of renewing a filter factor based on a differential between a signal (equalized signal) produced by application of equalizing filter and an ideal signal. Therefore, it takes much time before a filter factor converges to an optimum filter factor after equalization is started. As a result, a problem is presented that a quality of an equalized signal is degraded during the above time required before the convergence. To solve this problem, training time is required to make a filter factor converge prior to equalization of received data.

SUMMARY OF THE INVENTION

In view of the above, it is an object of the present invention to provide an equalizer capable of making a filter factor to be set in the equalizer having an equalizing filter converge rapidly and a method for setting an initial value for the rapid convergence of the filter factor.

According to a first aspect of the present invention, there is provided an equalizer including: a filter factor computing device to compute a filter factor; an equalizing filter to operate based on the filter factor computed by the filter factor computing device and to a received signal to obtain an output signal; and a differential detecting circuit to detect a differential between the output signal from the equalizing filter and a common pilot diffusing code and to input the detected differential as a differential signal to the filter factor computing device; the equalizer further including:

an initial value setting circuit to set an initial value for the filter factor computing device based on the received signal.

In the foregoing, a preferable mode is one wherein the initial value setting circuit includes a multipath timing detecting circuit to detect multipath timing by receiving the received signal and the common pilot diffusing code, a reverse diffusing circuit to which a path timing signal is fed from the multipath timing detecting circuit, and to which the received signal and the common pilot diffusing code are input, and a channel estimating device to estimate a channel based on an output signal from the reverse diffusing circuit.

Also, a preferable mode is one wherein the filter factor computing device includes an initial value generating circuit to generate an initial value of the filter factor by receiving a channel estimating result fed from the channel estimating device and a path timing signal fed from the multipath timing detecting circuit.

Also, a preferable mode is one wherein the filter factor computing device further includes a renewing circuit to renew the filter factor based on the differential signal fed from the differential detecting circuit and the received signal, and a selector to select an output from the renewing circuit and the initial value generating circuit.

Also, a preferable mode is one wherein the reverse diffusing circuit has "P" pieces of correlators each operating independently ("P" is an integer being 2 or more).

Also, a preferable mode is one wherein the reverse diffusing circuit, to which a path timing signal fed from the multipath timing detecting circuit, the received signal, and the common pilot diffusing code are input, has a plurality of correlators each operating independently of one another and performs reverse diffusing operations by multiplying the received signal by the common pilot diffusing code in synchronization with the multipath timing detected by the multipath timing detecting circuit.

Also, a preferable mode is one wherein the equalizing filter includes a plurality of delay circuits being cascaded, a plurality of multipliers to multiply each of input and output signals from the delay circuits by a filter factor, and an adder to sum up outputs from the multipliers.

According to a second aspect of the present invention, there is provided a method for setting an initial value for an equalizer having an equalizing filter to be used for a signal receiver to re-produce a signal whose quality is degraded due to influences by fading occurred during signal transmission in a mobile communication device such as a portable phone, the method including:

a step of setting a complex conjugate number of a fading vector (FV) obtained in synchronization with path timing of a received signal to be equalized, as a filter factor for the equalizing filter.

In the foregoing, a preferable mode is one wherein, after setting of the initial value, the filter factor for the equalizing filter is renewed by using a renewing signal produced based on the differential signal between an output signal from the equalizing filter and a common pilot diffusing code.

According to a third aspect of the present invention, there is provided an equalizer including a filter factor computing device to compute a filter factor; an equalizing filter to operate based on a filter factor computed by the filter factor computing device and to a received signal to obtain an output signal; a differential detecting circuit to detect a differential between the output signal from the equalizing filter and a common pilot diffusing code and to input the detected differential as a differential signal to the filter factor computing device; and an initial value setting unit to set an initial value for the filter factor computing device based on the received signal, wherein the initial value setting unit includes a multipath timing detecting circuit to detect multipath timing by receiving the received signal and the common pilot diffusing code, a reverse diffusing circuit, to which a path timing signal is fed from the multipath timing detecting circuit, and to which the received signal and the common pilot diffusing code are input, has a plurality of correlators each operating independently of one another and performs reverse diffusing operations by multiplying the received signal by the common pilot diffusing code in synchronization with the multipath timing detected by the multipath timing detecting circuit, and a channel estimating device to estimate a channel based on an output signal from the reverse diffusing circuit.

With the above configuration, since a complex conjugate number of an FV obtained in synchronization with path timing detected from a signal to be equalized is set as a filter factor from an initial step, the same effect as obtained by using a RAKE receiving method in which path timing and a phase of a path signal are combined together can be expected from its initial stage. Therefore, unlike in the conventional case in which an inappropriate value is set as an initial value for a filter, a quality of signals is less degraded and it is possible to make a filter factor converge rapidly. Moreover, a period of training to be, in advance, done in order to prevent degradation in the quality of signals can be shortened, which enables reduction of power consumption.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Figure 1:
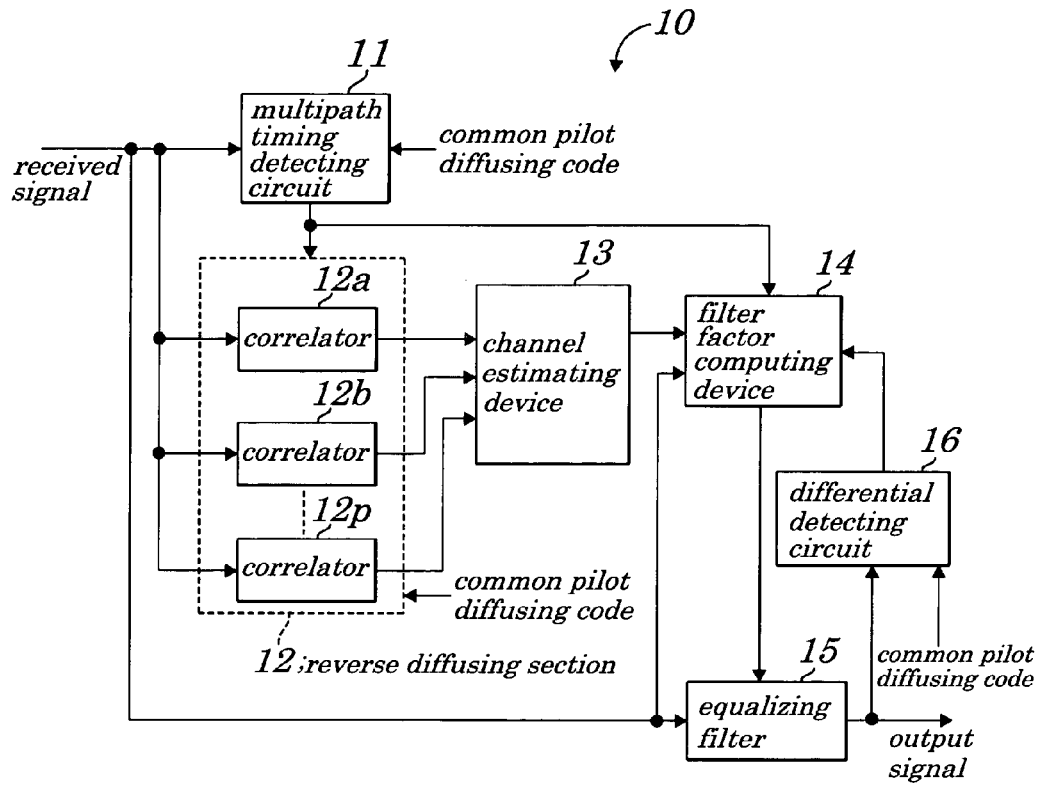
FIG. 1 is a block diagram for schematically showing configurations of an equalizer according to an embodiment of the present invention.

FIG. 1 is a block diagram schematically showing configurations of an equalizer or an NLMS (Nonlinear Least mean Square) equalizer (hereinafter may simply referred to as an "equalizer") according to an embodiment of the present invention. The equalizer 10 as shown in FIG. 1 includes a multipath timing detecting circuit 11, a reverse diffusing section 12 having the plurality of correlators 12a to 12p, a channel estimating device 13, a filter factor computing device 14, an equalizing filter 15, and a differential detecting circuit 16.

To the multipath timing detecting circuit 11, each of the correlators (12a to 12p) in the reverse diffusing section 12, the filter factor computing device 14 and the equalizing filter 15 is input a received signal. Also, to the multipath timing detecting circuit 11 is input a common pilot diffusing code and an output detected by the multipath timing detecting circuit 11 is input to the reverse diffusing section 12 and the filter factor computing device 14. Each of signals output from each of the correlators 12a to 12p in the reverse diffusing section 12 is input to the channel estimating device 13. Moreover, to the filter computing device 14 is input a received signal and a signal output from the differential detecting circuit 16 and its output signal is output to the equalizing filter 15, as well as inputting of a signal from the multipath timing detecting circuit. Then, to the differential detecting circuit 16 is input a signal output from the equalizing filter 15 and the common pilot diffusing code.

Main functions of each of components 11 to 14 making up the equalizer of FIG. 1 are described. The multipath timing detecting circuit 11 detects multipath timing from a received signal. The reverse diffusing section 12 has the plurality of correlators 12a to 12p each operating independently of one another and performs reverse diffusing operations by multiplying a received signal by a pilot signal diffusing code (common pilot diffusing code) in synchronization with multipath timing detected by the multipath timing detecting circuit 11. The channel estimating device 13 performs a channel estimating operation based on a result from the reverse diffusing operations performed by the reverse diffusing section 12. The filter factor computing device 14 computes a filter factor based on a result from the channel estimating operation performed by the channel estimating device 13.

Next, operations of the equalizer 10 shown in FIG. 1 are described. The multipath timing detecting circuit 11 correlates a received signal with a pilot signal diffusing code by using a correlator, and detects multipath timing from a received signal. The reverse diffusing section 12 has a plurality ("P" pieces) of the correlators 12a to 12p being operated independently and correlates the received signal with the pilot signal diffusing code in synchronization with path timing detected by the multipath detecting circuit 11 and performs a diffusing operation on the received signal. The channel estimating device 13 multiplies a pilot signal reversely diffused and re-generated in the reverse diffusing section 12 by a complex conjugate number of an ideal signal and calculates a fading vector (FV). The filter factor computing device 14 calculates and renews a filter factor.

Figure 2:
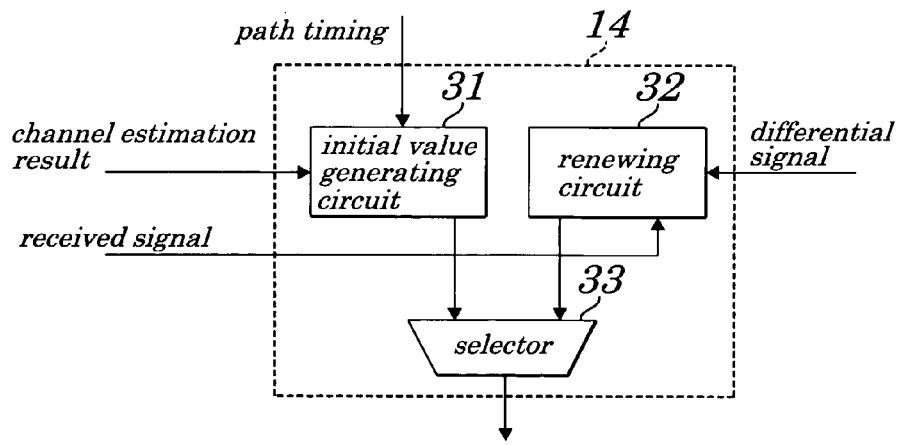
FIG. 2 is a functional block diagram showing detailed configurations of a filter factor computing device making up the equalizer in FIG. 1.

FIG. 2 is a functional block diagram showing detailed configurations of the filter factor computing device 14 in FIG. 1. The filter factor computing device 14 is made up of an initial value generating circuit 31, a renewing circuit 32, and a selector 33. To calculate an initial value for a filter factor, the initial value generating circuit 31 is used which generates an initial value of equalizing filter factor sequences "($W_0, \ldots, W_{F-1}$)" based on a path timing and a complex conjugate number of an FV corresponding to the path timing, at each path timing computed by the channel estimating device 13. Moreover, to renew a filter factor obtained after calculation of an initial value, the renewing circuit 32 is used which renews filter factor sequences based on an input signal from the differential detecting circuit 16 and a received signal sequence. The equalizing filter 15 correlates the filter factor sequence and the received signal sequence.

Figure 6:
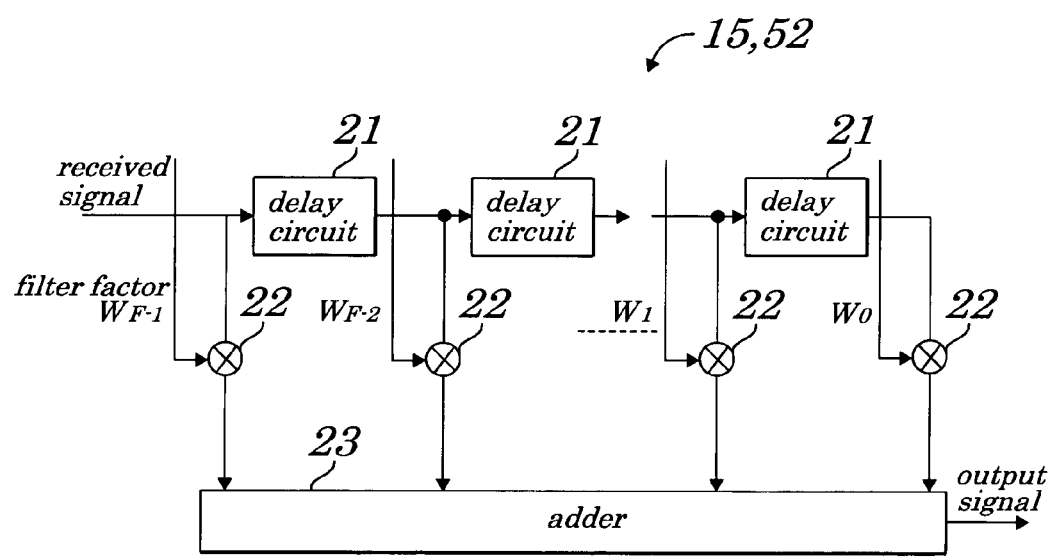
FIG. 6 is a block diagram showing a typical configuration of an equalizing filter of FIG. 5.

The equalizing filter 15 has the same configurations as those shown in FIG. 6, which includes a plurality ("F−1" pieces) of delay circuits 21, a plurality ("F" pieces) of multipliers 22, and an adder 23. Each of the delay circuits 21 delays a signal by one chip. The received signal is delayed, by one chip, up to (F−1)-th chip. The received signal delayed by $k (0 \leq k \leq F-1)$ chips is multiplied by a filter factor $W_{F-1-k}$ calculated by the filter factor computing device 14. All results from each multiplication are summed up by the adder 23 and output as output signals. The differential detecting circuit 16 calculates a differential "e(n)" between an output from the equalizing filter 15 and a diffusing code of a pilot signal.

Figure 3:
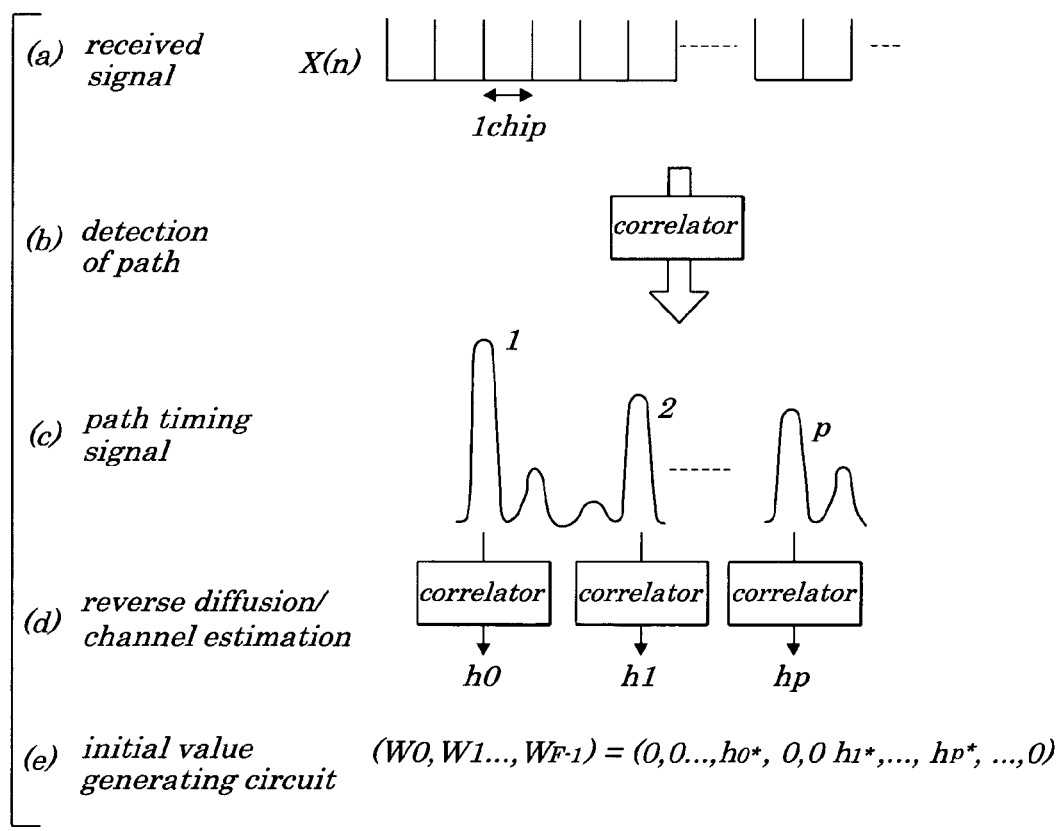
FIG. 3 is a diagram showing operations of the equalizer shown in FIG. 1.

Next, the method for setting an initial value in the NLMS equalizer 10 having the configurations shown in FIG. 1 is explained by referring to FIG. 3.

In FIG. 3, a first item (a) shows a received signal "X(n)", a second item (b) shows a state in which a path is detected by a correlator (one of 12a, 12b, . . . , 12p), a third item (c) shows a state in which timing is detected by the multipath timing detecting circuit 11, a fourth item (d) shows a state in which reverse diffusion and channel estimation operations are performed by the channel estimating device 13 and a fifth item (e) shows an initial value generated by the initial value generating circuit 31.

The multipath timing detecting circuit 11 correlates a received signal "X(n)" (see the first item (a) of FIG. 3) with a pilot signal diffusing code (see the second item (b) of FIG. 3). High-ordered "p" ($p \leq P$) pieces of path timing signals having strong correlations among them are output to the reverse diffusing section 12 and the filter factor computing device 14 (see the third item (c) of FIG. 3).

The reverse diffusing section 12 has "P" pieces of correlators 12a to 12p each operating independently of one another and correlates a received signal with a pilot signal diffusing code in synchronization with timing of each of high-ordered "P" pieces of path signals having large intensity detected by the multipath timing detecting circuit 11 and reversely diffuses the received signal to generate a pilot signal. The result obtained from the reverse diffusing operation performed by each of the correlators 12a to 12p in the reverse diffusing section 12 is output to the channel estimating device 13.

Figure 4A:
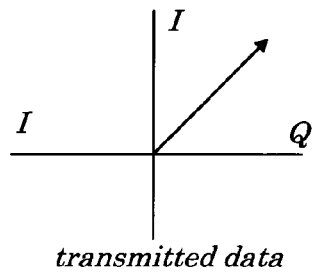
FIGS. 4(A), 4(B), and 4(C) are vector diagrams showing phases of various signals according to the embodiment of the present invention.
Figure 4B:
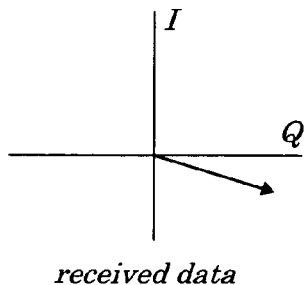
Figure 4C:
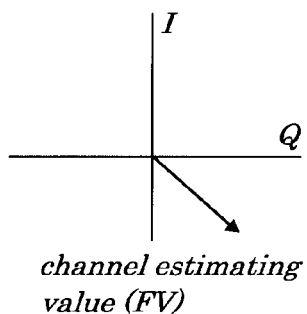
Figure 5:
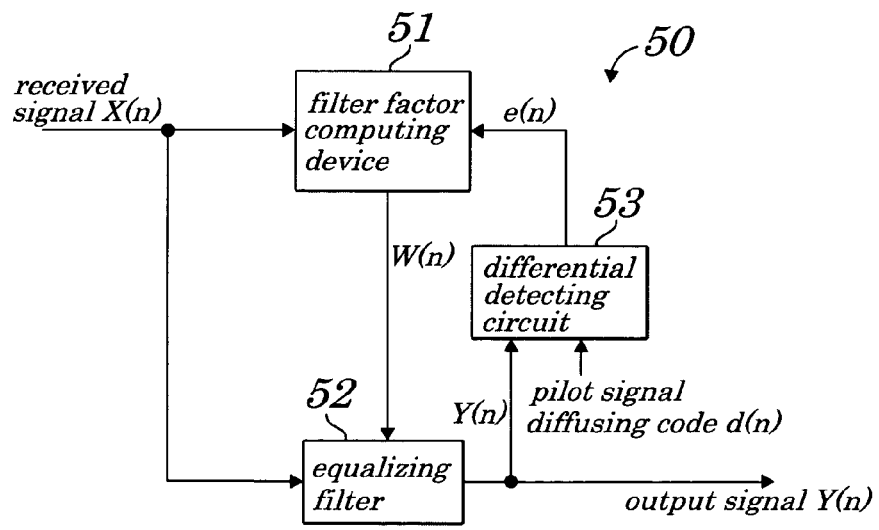
FIG. 5 is a block diagram for schematically showing configurations of a conventional NLMS equalizer.

Next, FIGS. 4A, 4B and 4C is a vector diagram showing a phase of transmitted data signal (FIG. 4A), received data signal (FIG. 4B) and a channel estimated value FV (FIG. 4C). As shown in FIGS. 4A, 4B and 4C, the transmitted data signal (see FIG. 4A) is received on a receiving side as a received data signal (FIG. 4B) in a state in which a phase has been changed due to phase rotation or fading caused by a deviation of a frequency between the transmitted data signal and the received data signal. The channel estimating device 13, in order to perform a channel estimating operation to estimate an influence caused by phase change occurred during the transmission of a received signal, multiplies a pilot signal value re-generated by reverse diffusion of the received signal by the reverse diffusing section 12 by a complex conjugate number of an ideal pilot signal and calculates an FV (fading vector) showing its phase change (see item (d) of FIG. 3). The FV (FIG. 4C) obtained from the calculation is output to the filter factor computing device 14.

In the filter factor computing device 14, its initial value generating circuit 31 calculates a complex conjugate of an FV input from the channel estimating device 13 and, by arranging the complex conjugate number of the FV as factor sequences in synchronization with timing with which the FV is obtained, generates an initial value of the equalizing filter factor sequence ($W_0, \ldots, W_{F-1}$) (see item (e) of FIG. 3). The equalizing filter factor sequence is set in the equalizing filter 15. Thereafter, as in the conventional case, the equalization using a filter and renewal of a filter factor are repeated by the renewing circuit 32.

The equalizer of the present invention is not necessarily an NLMS equalizer. Any adaptive equalizer such as an LMS (Least Mean Square) equalizer on the basis of which the NLMS equalizer has been constructed as is so configured as to change a filter factor based on a received signal may be used.

It is apparent that the present invention is not limited to the above embodiments but may be changed and modified without departing from the scope and spirit of the invention.

What is claimed is:

1. An equalizer comprising: a filter factor computing device to compute a filter factor; an equalizing filter to operate based on a filter factor computed by said filter factor computing device and to a received signal to obtain an output signal; a differential detecting circuit to detect a differential between the output signal from said equalizing filter and a common pilot diffusing code and to input the detected differential as a differential signal to said filter factor computing device; and an initial value setting circuit to set an initial value for said filter factor computing device based on said received signal;
   wherein said initial value setting circuit comprises a multipath timing detecting circuit to detect multipath timing by receiving said received signal and said common pilot diffusing code, a reverse diffusing circuit to which a path timing signal is fed from said multipath timing detecting circuit, and to which said received signal and said common pilot diffusing code are input, and a channel estimating device to estimate a channel based on an output signal from said reverse diffusing circuit.

2. The equalizer according to claim 1, wherein said filter factor computing device comprises an initial value generating circuit to generate an initial value of the filter factor by receiving a channel estimating result fed from said channel estimating device and a path timing signal fed from said multipath timing detecting circuit.

3. The equalizer according to claim 2, wherein said filter factor computing device further comprises a renewing circuit to renew the filter factor based on the differential signal fed from said differential detecting circuit and said received signal, and a selector to select an output from said renewing circuit and said initial value generating circuit.

4. The equalizer according to claim 1, wherein said reverse diffusing circuit has "P" pieces of correlators each operating independently ("P" is an integer being 2 or more).

5. The equalizer according to claim 1, wherein said reverse diffusing circuit, to which a path timing signal fed from said multipath timing detecting circuit, said received signal, and said common pilot diffusing code are input, has a plurality of correlators each operating independently of one another and performs reverse diffusing operations by multiplying the received signal by the common pilot diffusing code in synchronization with the multipath timing detected by said multipath timing detecting circuit.

6. A method for setting an initial value for an equalizer having an equalizing filter to be used for a signal receiver to re-produce a signal whose quality has been degraded during signal transmission in a mobile communication device, said method comprising:
   a step of setting a complex conjugate number of a fading vector obtained in synchronization with path timing of a received signal to be equalized, as a filter factor for said equalizing filter and
   wherein the fading vector is obtained by multiplying a pilot signal value of the received signal with a conjugate of an ideal pilot signal value.

7. The method for setting the initial value for the equalizer according to claim 6, wherein, after setting of said initial value, the filter factor for said equalizing filler is renewed by using a renewing signal produced based on a differential signal between an output signal from said equalizing filter and a common pilot diffusing code.

8. An equalizer comprising: a filter factor computing device to compute a filter factor; an equalizing filter to operate based on a filter factor computed by said filter factor computing device and to a received signal to obtain an output signal; a differential detecting circuit to detect a differential between the output signal from said equalizing filter and a common pilot diffusing code and to input the detected differential as a differential signal to said filler factor computing device; and an initial value setting means to set an initial value for said filter factor computing device based on said received signal,
   wherein said initial value setting means comprises a multipath timing detecting circuit to detect multipath timing by receiving said received signal and said common pilot diffusing code, a reverse diffusing circuit, to which a path timing signal is fed from said multipath timing detecting circuit, and to which said received signal and said common pilot diffusing code are input, has a plurality of correlators each operating independently of one another and performs reverse diffusing operations by multiplying the received signal by the common pilot diffusing code in synchronization with the multipath timing detected by said multipath timing detecting circuit, and a channel estimating device to estimate a channel based on an output signal from said reverse diffusing circuit.

* * * * *